FIG_1

United States Patent Office 3,128,945
Patented Apr. 14, 1964

3,128,945
CALCULATING MACHINE
Arthur J. Malavazos, Hayward, and Jan Urdal, Daly City, Calif., assignors, by mesne assignments, to Friden, Inc., San Leandro, Calif., a corporation of Delaware
Filed Aug. 31, 1962, Ser. No. 220,650
4 Claims. (Cl. 235—63)

This invention relates to calculating machines and particularly to a mechanism for selectively stopping a division operation in any predetermined ordinal position of the calculator carriage.

A primary object of the present invention is to provide an improved mechanism for terminating a division operation in any operator-selected ordinal position of the carriage, and hence is an improvement on the mechanism shown and described in the patent to Grant C. Ellerbeck, No. 2,753,114, issued July 3, 1956.

A further object of the present invention is to provide a division stop mechanism which is selectively operable at the will of the operator at any time during the course of a division problem—either to terminate the division operation immediately or at the end of an ordinal series of operations—and which, in addition, can be preset by the operator to stop operation in any preselected decimal position of the quotient.

In its preferred form the present invention will be embodied in a machine utilizing the division stop mechanism shown and described in the patent to Machado, No. 2,714,990, issued August 9, 1955. The stop mechanism there shown and described was operated manually, and, when operated in one direction, was effective to stop the division operation immediately, or, if operated in the other direction, to stop the operation at the end of that ordinal series of operations (in which a true quotient to that point stood in the quotient dial). The Machado mechanism also simultaneously, in either event, blocked operation of the customary "add" key mechanism, so as to retain the divisor factor in the keyboard in order to enable the operator to continue the division operation if it were desired. For example, one common and specific illustration of what is involved in the present invention is in connection with a calculator for the grain trade in which, at least in many grain shipping centers, it is customary to furnish a statement showing the total weight in pounds; the total whole number of bushels, with the balance in pounds; and the total cash value (the latter requiring the number of bushels with the balance in pounds expressed as a decimal fraction in order to determine price). For example, assume a shipment of 75,896 pounds of wheat priced at $1.85 a bushel. In many grain centers it is customary to prepare a statement showing the number of pounds of the shipment, which are converted to 1,264 bushels by dividing the shipment by 60 pounds to the bushel and stopping the division operation as soon as the whole number of bushels has been secured. This leaves a balance of 56 pounds, which must be shown on the statement in pounds. After noting on the statement the remainder in pounds, the division operation is continued in order to convert the 56 pounds to a decimal fraction, so that the whole can be multiplied by the price. Thus, at the end of the second division operation the operator would have 1,264.93 bushels (customarily not shown as a decimal fraction on the statement) and the price of $1.85, giving a total of $2,340.12. Prior to the Ellerbeck invention above-mentioned, it was necessary for the operator to strictly pay attention to the division operation and to operate the division stop key as soon as division had begun in the last whole number (with the "4" in the present example). The present invention is primarily effective to enable the operator to set an automatic division stopping mechanism which will stop the operation at the decimal point without releasing the value standing in the keyboard, in an improved manner and particularly designed to apply to the stop mechanism shown in the Machado patent just mentioned.

These and further objects of the present invention will be apparent from the specification and claims which follow, both of which will be readily understood by reference to the drawings in which:

FIG. 8 is a cross-sectional plan view of the machine showing the arrangement of the parts of the present invention when applied to the machine which constitutes the preferred embodiment of our invention.

For purposes of exemplification, we show and describe our invention in connection with the commercial calculating machine manufactured under the patent to Machado, No. 2,714,990, which, in turn, shows a machine such as that described originally in the patent to Friden, No. 2,229,889, dated January 28, 1941. It will be understood, however, that the invention is not limited to incorporation in such a machine as it can be incorporated in, or applied to, other commercial calculating machines on the market. It will be understood, therefore, that the machine shown in the accompanying drawings is for purposes of exemplification only and that the invention is not limited thereto.

Figure 1:
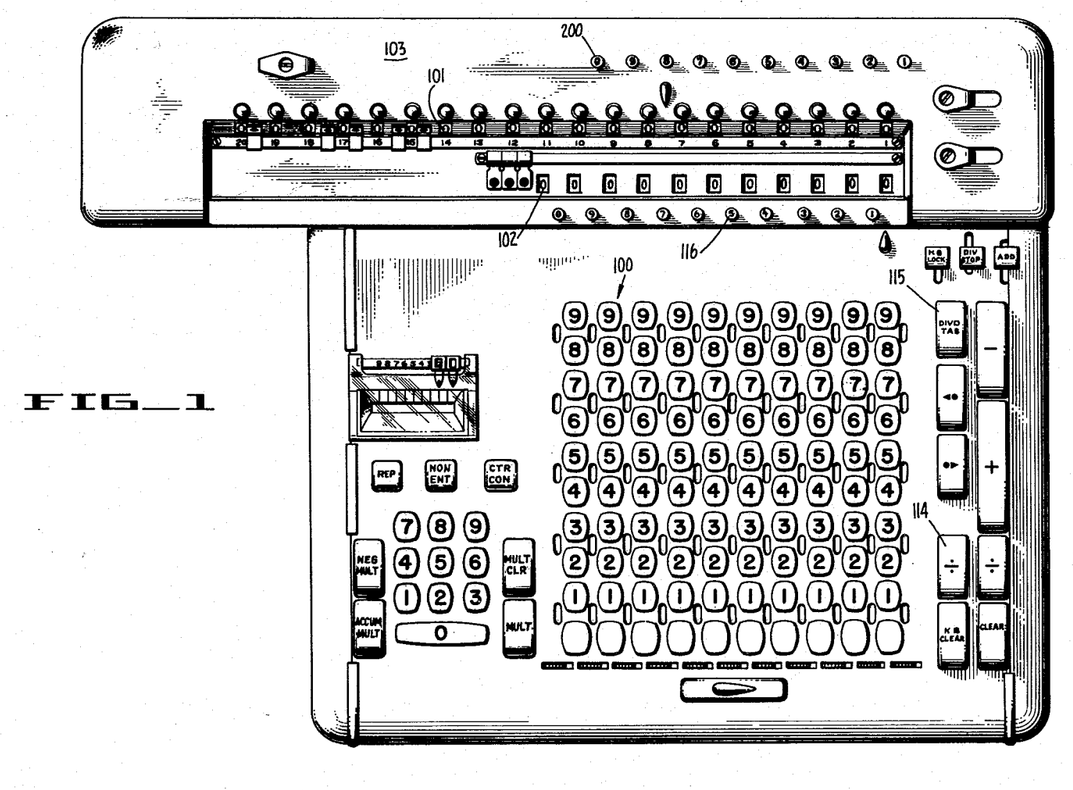
FIG. 1 is a plan view of the preferred machine in which our present invention is embodied.

The mechanisms of said patents are well known and will not be shown and described herein except insofar as they are essential to the operation of the mechanism of the present invention. The general construction of the machine is that described in the Machado patent, beginning with the heading "General Description" in column 2 and extending over to include the heading "Division Stop," ending at the bottom of column 10. It is only necessary to note that the machine is provided with a main keyboard 100 (FIG. 1) in which the operator sets the values which are to be registered in the accumulator dials 101 while the number of registration is counted in the revolutions counter 102 (FIG. 1). Both the accumulator 101 and the counter 102 are mounted in a shiftable carriage 103. In a division problem it is customary to enter the dividend set into the keyboard 100 into the accumulator 101 positively, as by the depression of a dividend entry key 115, at any preselected ordinal position of the carriage 103 (controlled by the depression of a tabulation control, or "tab," key 116). The divisor is then entered in the keyboard 100, and the divide key 114 is depressed. The depression of the divide key 114 closes the motor switch, operates the main clutch and conditions the machine for a division operation in which the divisor standing in the keyboard 100 will be repeatedly subtracted from the dividend standing in the accumulator 101 to an overdraft, the divisor then added into the accumulator to restore the overdraft, and the carriage 103 shifted one order to the left, whereupon a new ordinal series of subtractive operations is initiated.

Figure 3:
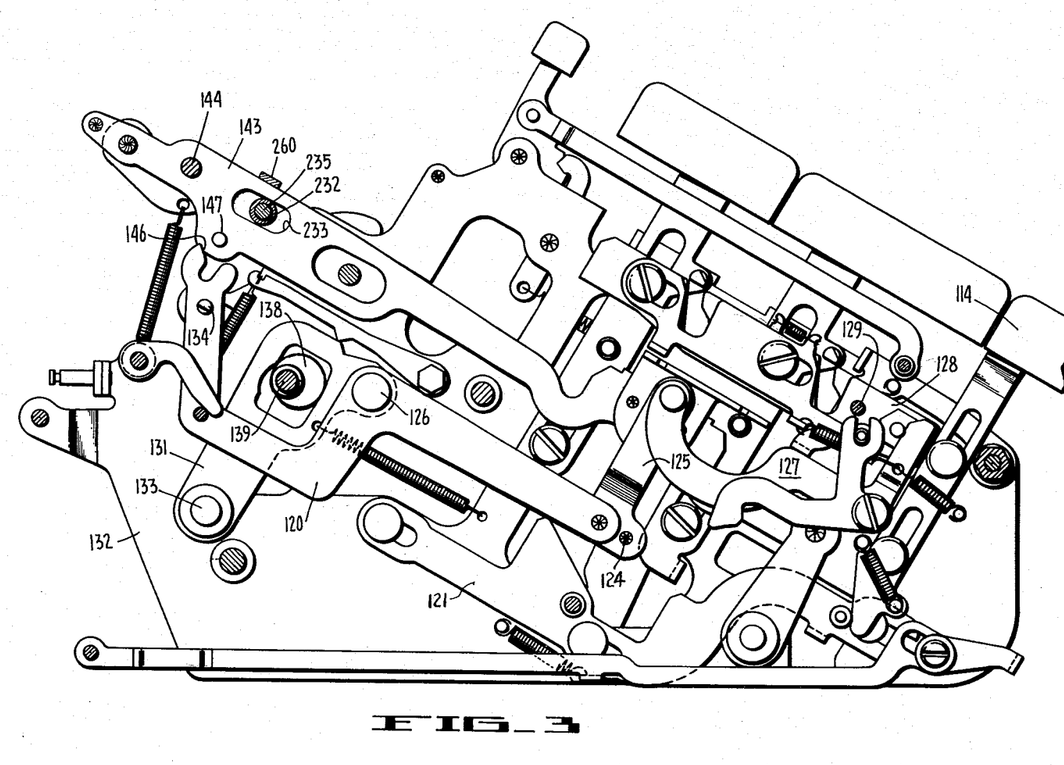
FIG. 3 is a left side view of the right side control plate of the machine shown in FIG. 1, and shows particularly the customary digitation control mechanism and the major portion of the division programming mechanism.
Figure 4:
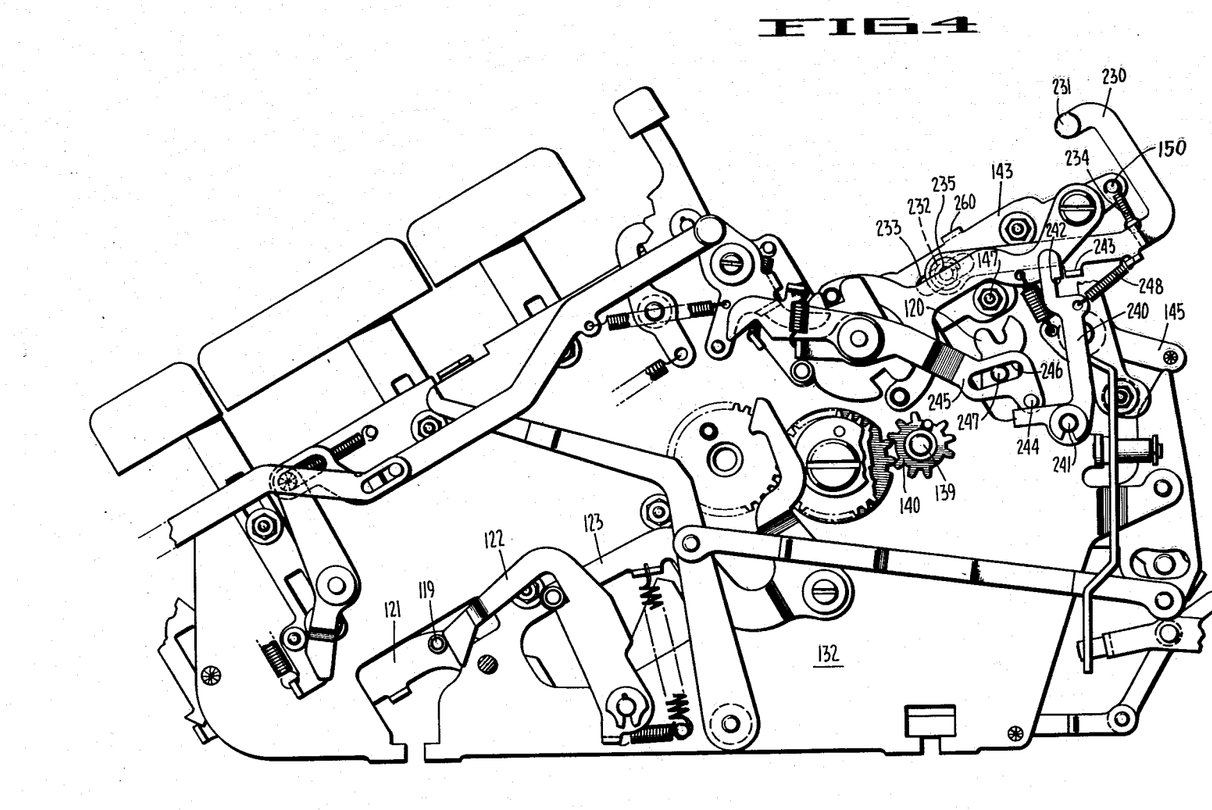
FIG. 4 is a right side view of the right side control plate, and shows additional features of the division control mechanism, and also a portion of the division stop mechanism of the present invention.
Figures 5, 6:
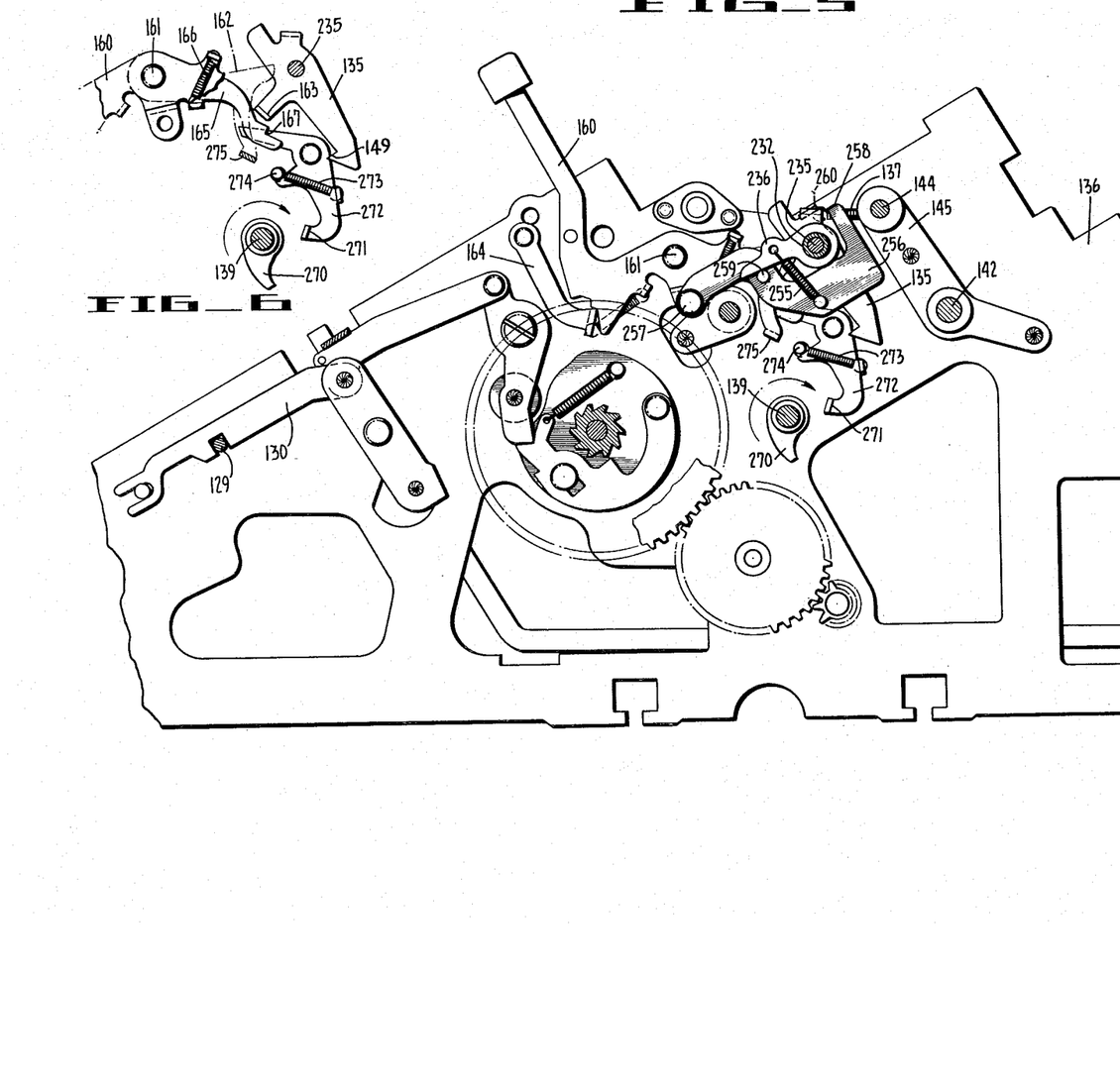
FIG. 5 is a right side view of the right side frame plate of the machine shown in FIG. 1 and shows additional portions of the division stop mechanism of the present invention.
FIG. 6 is a detail of the division stop mechanism with certain overlying parts removed.

Division is controlled by the rocking of a control lever 120 (FIG. 3) which is indirectly rocked to its effective position by depression of the divide key 114. The depression of the key 114 translates a slide 121 rearwardly. A roller 119 on the right-hand side of the slide projects through an aperture in the right side control plate 132 and engages the front end of a division latch 122 (FIG. 4). The rocking of the latch 122 releases an actuating lever 123, the dropping of which engages a pin 124 (FIG. 3) carried by a link 125 which is connected to the front end of the lever 120. Thus the depression of link 125 rocks the control lever 120 (clockwise in FIG. 3) about its pivot 126 and simultaneously rocks a bellcrank 127 to move a clutch control slide 128 rearwardly. A pin 129 carried by the slide 128 extends to the left and is embraced by a slot in a clutch control link 130 (FIG. 5). The operation of the clutch control link 130 and its effectiveness to cause operation of the main clutch and the closing of the power switch has been so often described that it is deemed unnecessary to repeat it at this time. Needless to say, the rocking of the control lever 120 (FIG. 3) has been effective to initiate machine operation, which operation will be continued so long as the lever 120 is held in its rocked position.

The division control lever 120 is mounted on the pivot stud 126 (FIG. 3) that is carried by a cam follower arm 131. The follower arm 131 is pivotally mounted on the right control plate 132 by any suitable means, such as a pivot stud 133. When rocked to its operative position (from depression of division key 114 and the operation of the spring-powered actuating arm 123 upon pin 124), the lever 120 is latched in its operative position. The customary latch comprises a half-round stud 134 riveted to, or otherwise rigidly secured on, the rear end of the lever 120 and a cooperating latch 135 (FIG. 5) which is pivotally mounted on the right frame plate 136 and is biased to an operative position by a spring 137. It can be noted that the latching of the control lever 120 in its operative position (clockwise from that shown in FIG. 3) not only retains the control mechanism in position for division but (through bellcrank 127 holding the clutch-operating slide 128 in its effective position) keeps the machine in continuous cycles of operation. This operation continues until the latch is released by means of a customary latch-releasing mechanism (not shown herein) which is effective when the division operation is completed in the home, or extreme left-hand, position of the carriage, or by means of a manually operated division stop key, which will hereinafter be explained.

The cam follower arm 131 is provided with a substantially rectangular aperture which embraces a cam 138 (FIG. 3) mounted on a cam shaft 139. A mutilated program gear 140 (FIG. 4), rigidly mounted on the right end of the cam shaft 139, is operative to rotate the shaft 139 and cam 138 through three increments of movement 120° each in the three cycles of operation following an overdraft in the accumulator register dials 101. In those three cycles the machine is operated in three steps: first, in the first cycle, the divisor value standing in the keyboard is added into the accumulator 101 to restore the overdraft which is effected by rocking the digitation control gate 141 (FIG. 2) from its subtractive to its additive position; secondly, during the second cycle the digitation control bar 141 is returned to its neutral position (shown in FIG. 2) and the carriage shifting mechanism is operated to shift the carriage and register one order to the left; and finally, in the third cycle, the mutilated gear 140 is returned to the normal position shown, thereby restoring the digitation control gate 141 to its subtractive position to initiate a continuous series of subtractions in the lower order. Each of these steps is secured by the translation of the division control lever 120 (FIG. 3) resulting from the rocking of arm 131 from the rotation of cam 138.

The digitation control gate 141 (FIG. 2) is rigidly mounted on a control shaft 142. In most operations the positioning of the shaft 142 and gate 141 is secured by operation of a digitation control bar 143 (FIG. 3), which is translated rearwardly in additive operation and forwardly in subtractive. A pin 144 adjacent the rear end of this bar pivotally engages a bearing in an arm 145 (FIG. 5) affixed to shaft 142 to rock the digitation control gate. In division operations the lifting of the rear end of the control lever 120 (FIG. 3) is effective to move the digitation control bar 143 forwardly to its subtractive position. This result is secured by means of a cam face 146 and notch in the rear end of the lever 120 which engages a pin 147 on the digitation control bar. The operation of the machine in division has been adequately described in former patents, such as Friden, Nos. 2,229,889 and No. 2,229,890, both issued on January 28, 1941, or Friden, No. 2,327,981, issued August 31, 1943. In view of the fact that the division mechanism and the details of its operation are unnecessary to an understanding of the present invention, it is believed that this sketchy description is sufficient.

For many years it has been customary to provide the machines manufactured under the patents above-mentioned with a manually controlled division stop mechanism of the type shown in the patent to Friden, No. 2,327,-981 (FIG. 4 thereof), or in the patent to Machado, No. 2,714,990 (FIG. 8 thereof). This mechanism comprises a control lever 160 (FIG. 5) which is pivotally mounted on the right side frame plate 136 by any suitable means, such as pivot stud 161. The rear end of the lever 160 is formed with a rearwardly extending cam finger 162 (FIG. 6) which overlies an ear 163 formed on a forwardly extending projection of the latch 135. It is apparent that rearward rocking of the control lever 160 (clockwise in FIGS. 5 and 6) causes the cam finger 162 to engage ear 163 and hence rock the latch 135 (counter-clockwise in these figures) to its releasing position. Thereupon the control lever 120 is immediately released and the machine stops at the end of that cycle of operation. It can be mentioned that while the stop lever 160 can be latched in its two other positions, it is not detented in this position just described, so it will be returned to its normal, inoperative position immediately upon its release by the operator.

The stop lever 160 can also be rocked from its normal, inoperative and intermediate position (shown in FIGS. 5 and 6) forwardly (counter-clockwise in these figures), in which position it will be detented by the usual detent 164. In this position the stop lever sets a control mechanism which is effective to stop the machine at the end of the shifting cycle of the three-cycle operation that occurs in division between orders, thereby giving a true quotient in the register dials to that ordinal position, for the machine has continued operation to the overdraft, the addition of the divisor to correct the overdraft and the shifting of the register to the next ordinal position. The mechanism for this delayed stop is shown particularly in FIG. 6 and comprises an arm 165 pivotally mounted on the pivot stud 161. A spring 166 tensioned between ears formed on the arm 165 and on the rear end of stop lever 160 biases the arm 165 to follow rocking of the stop lever 160. The rear end of the pivotally mounted arm 165 is formed with a shoulder 167 adapted to engage the ear 163 on latch 135. When the stop lever 160 is pulled forwardly (counter-clockwise in FIGS. 5 and 6) it is resiliently latched in that position by the detent 164. The arm 165, from the force of spring 166, follows the rocking of the lever 160 until its upper edge engages the ear 163, at which time the shoulder 167 will not engage the ear 163 but further movement of arm 165 is blocked. However, when the mutilated program gear 140 (FIG. 4) is driven to its first position after the overdraft, the rotation of the cam 138 (FIG. 3) rocks cam follower arm 131, and hence the control lever 120, rearwardly to set the digitation control gate 141 for additive operation. The rearward movement of the digitation control bar 143 (FIG. 3), resulting from this operation, obviously rocks the latch 135 (counter-clockwise in FIG. 6) for stud 134 (FIG. 3) is latched on a shoulder 149 at the lower end of the latch 135. When this occurs the ear 163 rocks into registry with the shoulder 167, and the latch 135 is thereby latched in this rearward, counter-clockwise position. Then, at the end of the additive, corrective cycle, the second phase of rotation of the multilated control gear 139 rocks the cam follower arm 131 and control lever 120 to an intermediate, or shift-controlling position, thereby pulling the digitation control bar 143 forwardly to the intermediate position shown. The forward movement of the control lever 120 (to the right in FIG. 3) pulls the stud 134 from engagement with the latch 135, as the latch is held in its rearward or counter-clockwise position. Thus the control lever 120 is released and the machine comes to rest at the end of the shifting cycle.

It has been mentioned that in the second cycle of the interordinal program, the register 103 is shifted one order to the left. The shifting mechanism, as such, forms no part of the present invention, and so will not be described. Reference can be made, however, to the patent to Machado et al., No. 2,653,765, of September 29, 1953, and Matthew, No. 2,636,678, of April 28, 1953, for a detailed description of such a mechanism.

Figure 2:
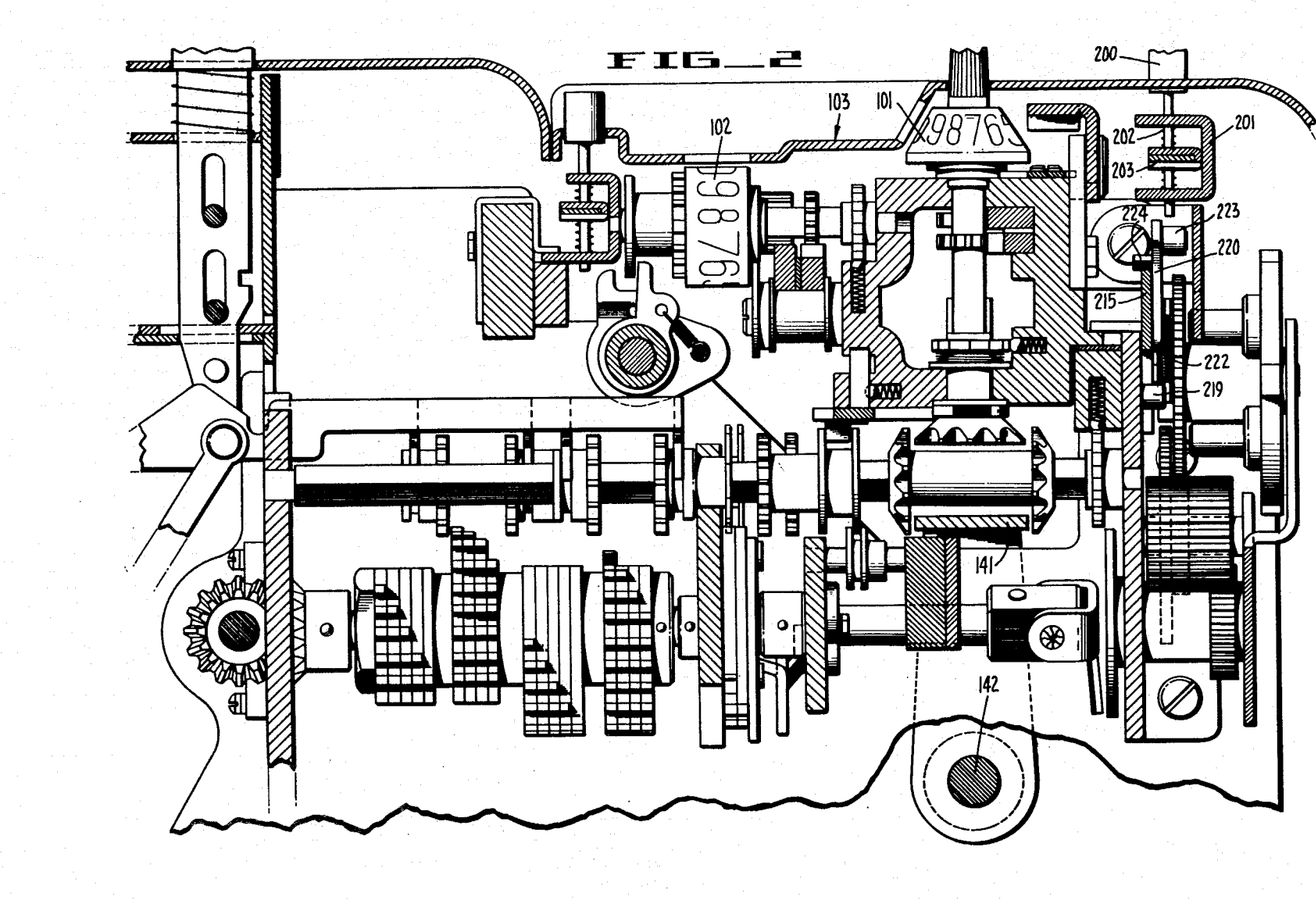
FIG. 2 is a cross-sectional view of the selection, actuating and registering mechanism of the machine shown in FIG. 1, showing certain portions of the present invention in cross-section.
Figure 7:
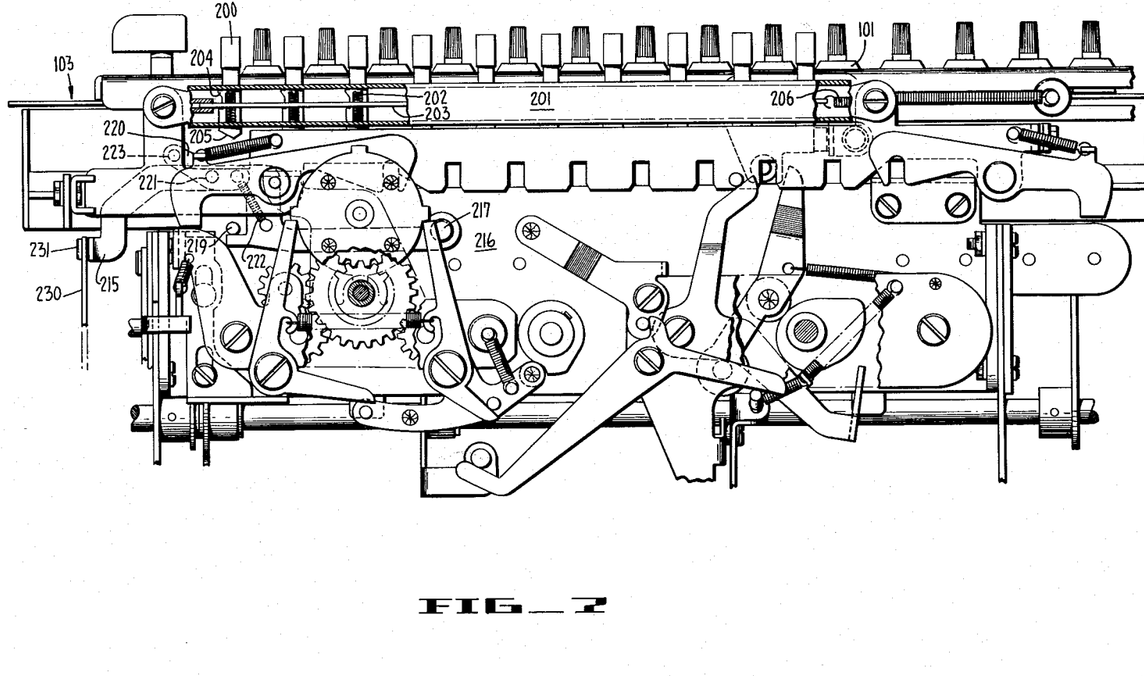
FIG. 7 is a rear view of the machine showing certain details of the present invention.

The present invention relates to means whereby a division operation may be automatically terminated in any preselected order. We prefer to control the automatic division stop mechanism by means of the depression of one of a plurality of stop buttons, or keys, 200 (FIGS. 1 and 2). Preferably there are ten of these keys: nine (numbered "1" to "9") for determining the ordinal position of the carriage 103 in which the division is to be stopped (customarily there are nine such shifts possible in such machines), and a tenth marked "0" for releasing any depressed and operative key. These keys are severally mounted in a channel 201 (FIG. 2) mounted in the carriage. The keys are individually biased to a raised and inoperative position by respective springs 202 and are latched in a depressed position by a latching slide 203 which cooperates with a latching shoulder 204 (see FIG. 7) formed on the edge of each key stem. The lower end of the several key stems are bevelled, as at 205, in order to permit camming engagement with a roller adapted to be engaged by a depressed key stem. The latching bar 203 is normally biased to the left (to the right in FIG. 7) by a suitable spring 206 tensioned between the left end of the latching bar 203 and a suitable stud secured to the carriage 103.

During shifting operations of the carriage 103, a depressed key 200 will engage and operate a stop lever 215 which is pivotally mounted on the rear bearing plate 216 (FIG. 7) by any suitable means, such as a pivot stud 217. This operating arm 215 is normally biased to a raised and inoperative position by a suitable spring 234 (FIG. 4) which is secured to the spring seat in the interponent lever 230 and a stud 150 on the digitation control bar 143. A pin 219 (FIG. 7) secured to the rear bearing plate 216 prevents overrocking of the arm 215 from the force of spring 234. The arm 215 extends to the right (to the left in FIG. 7) to a point to the right of the right side control plate 132, as shown. At an intermediate point the operating arm 215 carries a live point, or resiliently mounted bracket, 220. This live point is resiliently mounted on the operating arm 215 by any suitable means, such as a pivot pin 221, and is resiliently biased to an operative position (the clockwise position shown in FIG. 7) by a suitable spring 222 tensioned between a stud thereon and another fixed to the arm 215. At its upper end the live tip 220 carries a rooler 223 (see also FIG. 2) which is adapted to be engaged by the lower end of a depressed key stem 200. If the carriage 103 is moving from right to left (to the right in FIG. 7), the engagement of the bevelled lower end of a depressed key 200 not only forces the roller 223 downwardly, but tends to rock live point 200 in a clockwise direction in this figure. Such rocking is prevented by means of an ear 224 (see FIG. 2), so that the arm 215 must also be depressed. On the other hand if the carriage 103 is moving from left to right (to the left in FIG. 7), the engagement of the lower end of a depressed key 200 will tend to rock the live tip 220 (counter-clockwise in FIG. 7), whereupon the spring 222 yields and arm 215 remains in its elevated and inoperative position.

The interponent lever 230 is pivotally mounted on the right end (left end in FIG. 7) of the lever 215 by any suitable means, such as pivot pin 231. The front end of this interponent lever 230 is rigidly mounted on a sleeve 232 supported on a short shaft 235 (see FIGS. 4 and 8). The shaft 235 extends between the right side control plate 132 and the right side frame plate 136, and it and the sleeve 232 extend through a slot 233 in the digitation control bar 143, as shown in FIG. 3. The interponent arm 230, and consequently the actuating arm 215, are biased in an inoperative or raised, position by some suitable means, such as the spring 234, tensioned between the spring seat in the arm 230 and the stud 150 on some suitable member, such as the digitation control bar 143 (FIG. 4). To the left of the control plate 132, and between that plate and the right side frame plate 136, the sleeve 232, upon which the arm 230 is secured, carries a forwardly extending arm 236 (FIGS. 5 and 8). Thus the arm 230, sleeve 232 and arm 236, in effect, form a bellcrank which is rocked (clockwise in FIGS. 4 and 5) whenever the roller 223 (FIG. 7) is engaged by a depressed key stem 200 during leftward shifting of the carriage 103.

When the arm 230 is so rocked, it is latched in its operative position by means of a bellcrank latch arm 240 (FIG. 4) which is pivotally mounted on the right side control plate by some suitable means, such as a pivot stud 241. The upper end of the latch arm 240 is formed with a shoulder 242 adapted to engage an ear 243 formed on the interponent lever 230. Normally the latch is held in an inoperative position by means of a pin 244 engaging a tail of the latch 240. The pin 244 is carried on a counter-locking lever 245, conventional in the machine of the patents above-mentioned. A slot 246 in the rear end of the counter-locking lever 245 embraces a pin 247 carried by the division control lever 120. This counter-locking lever 245 and its operation is described in a number of patents, such as the patent to Friden, No. 2,294,111, of August 25, 1942, so it is believed unnecessary to describe it in detail. However, it should be noted that as the division control lever 120 is lifted to engagement with pin 147 of the digitation control bar 143, the counter-locking lever 245 is rocked (counter-clockwise in FIG. 4). Such rocking of the counter-locking lever 245 releases latch 240 to the force of its spring 248 tensioned between seats in the latch and the secondary operating arm, or interponent lever, 230. Thereupon the edge of the latch arm 240, above the shoulder 242, will engage the ear 243 and when the interponent arm is depressed, the shoulder 242 becomes effective to latch the arm in the depressed position.

When the interponent arm 230 is rocked to its operative position (clockwise from the position shown in FIG. 4) and latched in that position, the arm 236 (FIG. 5) is also rocked in the same direction. This arm is connected, by means of a spring 255, to an arm 256 which is pivotally mounted on the division stop lever 160 by some suitable means, such as pivot pin 257. This pin is so located on the arm of 160 that when the arm 256 is urged rearwardly, such movement pulls the division stop arm 160 to the delayed stop position previously described. The arm 256 is formed to go around the shaft 235 and with an upstanding projection 258 at its rear end. A pin 259 on arm 256 engages the lower edge of arm 236, and thus prevents lifting of the arm 256 by spring 255 beyond the position shown. Thus, when the arm 236 is in the normal position shown in FIG. 5, the arm 256 is held in a depressed and inoperative position, but as soon as the arm 236 is rocked, the arm 256 is biased upwardly by spring 255. In the centralized, or inoperative position of digitation control bar 143, ear 260 lies immediately in front of and above the nose of arm 256, as shown.

It will be recalled that the digitation control bar 143, prior to the first cycle of the interordinal program, is in the forward or subtractive, position (to the right in FIG. 3 or to the left in FIGS. 4 and 5). In this position of the digitation control slide 143, the ear 260 will lie considerably in front of the nose 258 of arm 256. It will be recalled, also, that in the first cycle of the interordinal program the digitation control bar 143 is moved rearwardly (to the left in FIG. 3 and to the right in FIGS. 4 and 5) to the additive position in order to correct the overdraft. Such movement of the control bar 143 causes the ear 260 to engage the upper end 258 of arm 256 and hence pulls it rearwardly. This sets the division stop arm 160 to the delayed stop position, and hence the division operation will be terminated by the customary division stop mechanism at the end of the second cycle, or shifting phase, of the interordinal operation.

It should be noted that the division stop mechanism is restored to its neutral, or inoperative position at the end of the interordinal program operation by means of a cam 270 (FIGS. 5 and 6) mounted on the shaft 139 to the left of the mutilated control gear 140. It will be recalled that the shaft 139 is given three increments of movement of 120° each in the three interordinal program cycles in division. It is apparent that the cam 270, which is shown in these figures in the normal, or inoperative, position of the shaft 139, will engage an ear 271 on a cam follower arm 272 in the third interordinal cycle. The cam follower 272 is biased to the position shown in these figures by a spring 273 tensioned between a seat on the lower portion of the follower arm 272 and a stop pin 274. When the ear 271 of the follower is engaged by the cam 270, the follower arm 272 is rocked (counterclockwise in these figures). Thereupon the forwardly extending arm of the bellcrank follower 272 engages an ear 275 on a projection from the stop lever 160. Thus, the rocking of the bellcrank follower 272, from operation of cam 270, rocks the lever 160 (clockwise in FIGS. 5 and 6) to restore it to its neutral, or inoperative, position.

It is thus possible to operate the automatic division stop mechanism as many times as desired, for each depressed key 200 will be effective to stop division in that ordinal position of the carriage 103.

It will be manifest to those skilled in the art that while the present invention has been shown and described as embodied in a machine of the type disclosed in the patents above mentioned, this invention is not limited to incorporation in such a machine, but may be applied to other commercial calculating machines on the market.

We claim:
1. In a calculating machine having:
    (1) a selection mechanism,
    (2) a shiftable carriage,
    (3) an ordinally arranged accumulator in said carriage,
    (4) An accumulator driving means under the control of said selection mechanism for differentially driving said accumulator,
    (5) a digitation control member for controlling operation of said driving means additively or subtractively,
    (6) means for shifting said carriage,
    (7) a division control mechanism operative to control operation of said digitation control member and said shifting means to divide a dividend registered in said accumulator by a divisor set in said selection means by the method of continuous subtraction to an overdraft followed by a corrective additive cycle to correct the overdraft and a shift of the carriage,
    (8) a stopping mechanism operative during the first succeeding operation of the shifting means to terminate a division operation,
an automatic means for operating said division stopping mechanism in a preselected ordinal position of the carriage comprising:
    (9) a plurality of ordinally arranged keys mounted in said carriage and representative of the ordinal positions of said carriage movable from a normally inoperative to an operative position,
    (10) means for latching said keys in an operative position,
    (11) a connecting member carried by said stopping mechanism and adapted to engage said digitation control member,
    (12) resilient means for biasing said connecting member into engagement with said digitation control member,
    (13) blocking means normally disabling such engagement of said connecting means with said digitation control member, and
    (14) means operated by an operated key upon movement of said carriage into the ordinal position represented by such key for operating said blocking means to enable said connecting means to engage said digitation control member.

2. In a calculating machine having:
    (1) a frame,
    (2) an ordinally shiftable carriage mounted in said frame,
    (3) an ordinally arranged accumulator in said carriage,
    (4) a selection mechanism in said frame,
    (5) an accumulator driving means under the control of said selection mechanism for differentially driving said accumulator,
    (6) a digitation control member for controlling operation of said driving means additively or subtractively,
    (7) means for ordinally shifting said carriage,
    (8) a set of ordinally arranged shift control keys for terminating operation of said shifting means in a selected ordinal position of the carriage,
    (9) a division control mechanism operative to control operation of said digitation control member and said shifting means to divide a dividend registered in said accumulator by a divisor set in said selection means by the method of continuous subtraction to an overdraft followed by a corrective additive cycle to correct the overdraft and a shift of the carriage,
    (10) a means for holding said division mechanism in its operative position,
    (11) a stopping mechanism operative during the first succeeding operation of the shifting means to release said holding means, and
    (12) manual means for operating said stopping mechanism,
an automatic means for operating said division stopping mechanism in a preselected ordinal position of the carriage comprising:
    (13) a second set of a plurality of ordinally arranged keys mounted in said carriage and representative of the ordinal position of said carriage,
    (14) a normally inoperative interponent mounted on said stopping means,
    (15) means mounted on said frame and operated by the shifting of the carriage into an ordinal position corresponding to an operated one of said second set of keys for conditioning said interponent for operation, and
    (16) means operated by the movement of the digitation control member from its subtractive to its additive position for operating said interponent if conditioned for operation.

3. In a calculating machine having:
(1) a frame,
(2) a carriage ordinally shiftable relative to said frame,
(3) an ordinally arranged accumulator mounted in said carriage,
(4) a keyboard,
(5) a differential drive means controlled by said keyboard for operating said accumulator,
(6) a digitation control member for controlling additive or subtractive operation of said differential drive means,
(7) means for ordinally shifting said carriage,
(8) a set of ordinally arranged shift control keys for terminating operation of said shifting means in a selected ordinal position of the carriage,
(9) an automatic division mechanism operative to control operation of said digitation control member and said shifting means to divide a dividend in said accumulator by a divisor in said keyboard, and
(10) a division stopping mechanism effective to terminate machine operation upon operation of said shifting means, an automatic means for operating said division stopping mechanism in a preselected order comprising:
(11) a second set of a plurality of ordinally arranged keys mounted in said carriage and representative of the ordinal position of the carriage,
(12) an operating member mounted on said frame and adapted to be operated by an operated one of said second set of keys upon shifting of the carriage to an ordinal position representative of said key,
(13) means for latching said operating member in its operative position,
(14) a normally inoperative connecting member for operating said division stopping mechanism,
(15) means mounted on said digitation control member for operating said connecting member, and
(16) means operated by said operating member for enabling operation of said connecting member.

4. In a calculating machine having:
(1) a frame,
(2) a carriage shiftable relative to said frame,
(3) an ordinally arranged accumulator mounted in said carriage,
(4) a keyboard,
(5) a differential drive means controlled by said keyboard for operating said accumulator,
(6) a digitation control member for controlling additive or subtractive operation of said differential drive means,
(7) means for shifting said carriage,
(8) a set of ordinally arranged shift control keys for terminating operation of said shifting means in a selected shifted position of said carriage,
(9) an automatic division mechanism operative to control operation of said differential drive means in continuous cycles of subtraction to an overdraft and then effect an additive corrective cycle and an operation of said shifting means to divide a dividend in said accumulator by a divisor in said keyboard,
(10) a detent means for maintaining said division mechanism in its operative position,
(11) a division stopping mechanism effective to release said detent means during operation of the shifting means in the order in which the machine is operating at the time the stopping mechanism is operated, and
(12) a manual means for operating said stopping mechanism, an automatic means for operating said division stopping mechanism in a preselected order comprising:
(13) a second set of a plurality of ordinally arranged keys mounted in said carriage,
(14) an operating member mounted on said frame and adapted to be operated by an operated one of said second set of keys,
(15) means for latching said operating member in its operative position,
(16) a normally inoperative connecting member mounted on said division stopping mechanism and positionable to an operative position by said operating member, and
(17) means mounted on said digitation control member for operating said connecting member when so positioned during an additive operation.

References Cited in the file of this patent
UNITED STATES PATENTS

| | | |
|---|---|---|
| 1,292,513 | Rechnitzer | Jan. 28, 1919 |
| 2,753,114 | Ellerbeck | July 3, 1956 |
| 2,969,177 | Gubelmann | Jan. 24, 1961 |